Dec. 6, 1927.
F. G. DUNHAM
1,652,003
MUSIC ROLL FOR AUTOMATIC PIANOS AND THE LIKE
Filed Dec. 19, 1923
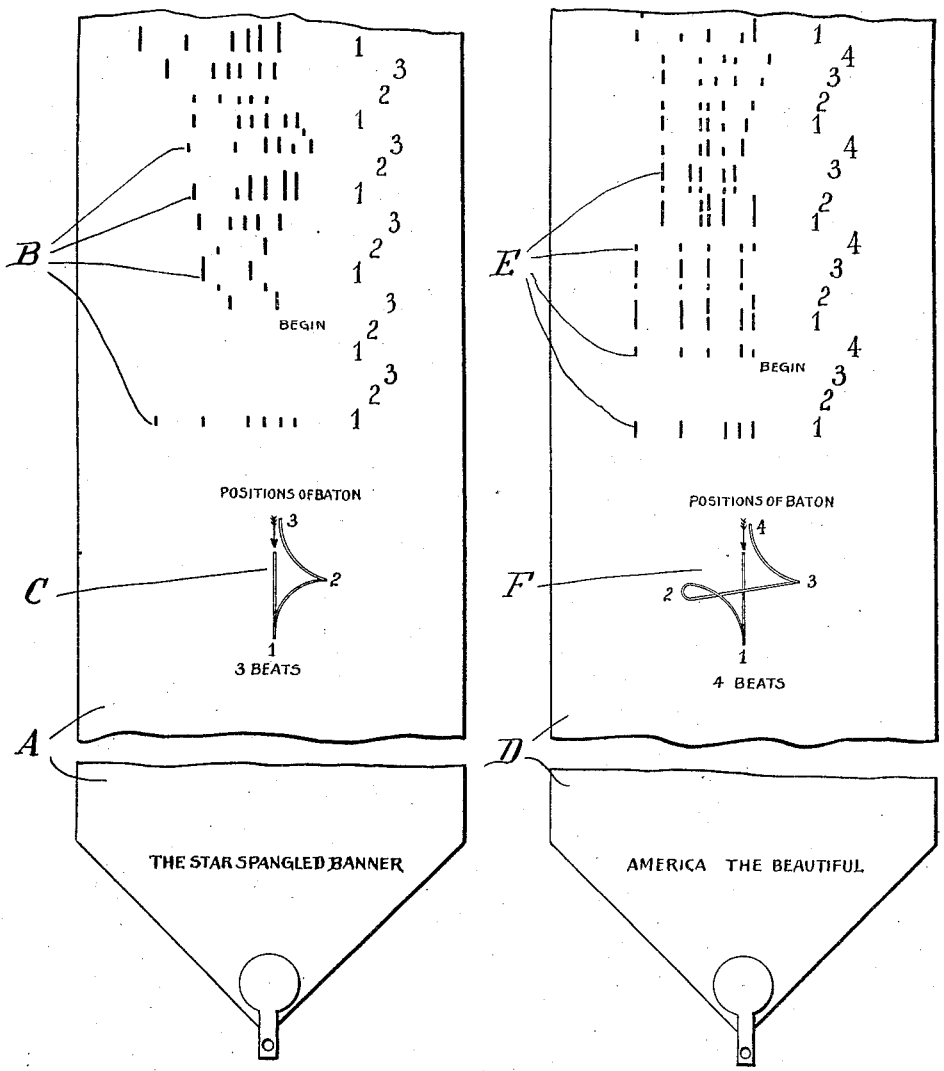

Patented Dec. 6, 1927.

1,652,003

UNITED STATES PATENT OFFICE.

FRANKLIN G. DUNHAM, OF BROOKLYN, NEW YORK, ASSIGNOR TO THE AEOLIAN COMPANY, A CORPORATION OF CONNECTICUT.

MUSIC ROLL FOR AUTOMATIC PIANOS AND THE LIKE.

Application filed December 19, 1923. Serial No. 681,525.

My present invention relates to an improvement in music-rolls for automatic pianos and the like such as automatic organs, whereby a musically uneducated person, by following indicia on the roll, can readily lead others in singing the selection while the roll is playing the accompaniment, said indicia showing the person how to mark the time of the composition for the singers' guidance to all intents like the conductor of an orchestra or oratorio. By my invention, an automatic player and music-roll thus become readily and effectively usable as an adjunct to community singing and the like.

The drawings show two embodiments of my invention in its preferred form, Fig. 1 being a plan view of part of a perforated music-roll entitled The Star Spangled Banner, and with which is combined indicia coming within my present improvements; and Fig. 2 is the same except that the roll is for a different composition,—America the Beautiful—written in different tempo and therefore shows appropriately different indicia within my invention.

Describing now my invention by way of the illustrative embodiments thereof shown in the drawings, and referring in the first instance to Fig. 1, this shows part of the front end A of a perforated music-roll having the usual music perforations B for playing the accompaniment of The Star Spangled Banner on an automatic piano. In this specification I have used letters to designate the parts of the drawings to the exclusion of numerals and have done this to avoid any possible confusion with the numerals which appear on the commercial rolls as shown in the drawings and which form part of the insignia comprising my invention as will hereinafter appear.

This particular composition, written in three-quarter time, has three beats to the measure. The incidence of each of these beats relatively to the music perforations B is indicated for every measure throughout the roll by the numerals 1, 2 and 3 located adjacent the music perforations in proper synchronized relation thereto. The numeral 1 indicates the first beat of each measure and the numerals 2 and 3 indicate respectively the second and third beats.

The diagram C entitled "Positions of baton" shows the path traced by the end of a conductor's baton when beating one measure in three-quarter time as in playing The Star Spangled Banner. The baton makes three movements in each measure. The first movement is downwards, as shown by the arrow in the diagram, and ends at 1 which is intended to indicate that in practice this first baton movement ends synchronously with each and every beat designated 1 adjacent the music perforations. The second baton movement is upwardly and laterally to the right in accordance with the diagram and ends at 2 to correspond with the beats 2 on the roll adjacent the music perforations. The third baton movement in each measure is upwardly and to the left and ends at 3 to correspond with the beats 3 adjacent the music perforations.

Suppose now the roll of Fig. 1 is to be used in community singing. The roll is inserted in the usual way in an automatic piano. Meanwhile, the person who is to lead the singing has noted from the diagram C that he must give three strokes to his baton during each measure in accordance with the diagram. The roll is then started at the tempo or speed of travel proper to said roll. He will then time his first baton stroke to end at the same moment that the first numeral "1" adjacent the music perforations reaches the tracker bar ducts of the piano. Similarly, he will time the second and third baton strokes with the incidence of the succeeding numerals 2 and 3 at the tracker ducts. He will repeat this same cycle of baton strokes coincidentally with the arrival at the tracker ducts of the succeeding numerals 1, 2 and 3, every baton stroke 1, 2 and 3 respectively synchronizing with beat 1, 2 and 3 of every measure at the moment the numerals designating said beats severally arrive at the tracker ducts.

He will continue to mark the time for the guidance of the singers so long as the measure beat numerals occur, which will ordinarily be throughout the length of the roll. If the tempo should change, or if there should be a plurality of accompaniments on one roll, there will be provided another diagram or diagrams C on the roll appropriate to the changed tempo, located a little ahead of the actual place on the roll where the change occurs. Further, the measure beat numbers adjacent the music perforations will be changed to accord with the new tempo, as will be next explained.

For example, suppose the tempo should change to four quarter or common time; then I would precede this change on the roll with a diagram like F in Fig. 2 and there would now be four measure beat numerals properly located relatively to the music perforation portion of the music-sheet.

In said Fig. 2 I have shown a composition in common time embodied in a separate music-roll provided with my aforesaid improvements. The music perforations E in this roll represent the accompaniment of the song America the Beautiful. The diagram F on this roll indicates to the person that is to do the leading that he must make four strokes of his baton in accordance with the diagram for each measure; and that he must time these baton strokes to occur respectively at the moments when the numerals 1, 2, 3 and 4, designating the measure beats arrive at the tracker ducts, the roll, of course, being played at the tempo speed proper thereto.

In short, the principle remains the same in Fig. 2 as in Fig. 1, the only difference being in the shape of the diagram F and in the number of the measure beats to accord with the new tempo.

Those skilled in the art will be readily able from these illustrations to prepare rolls with the proper indicia to correspond with the particular tempo of any selection, for the guidance as aforesaid of a person to act as a leader of community singing or the like.

The word "Begin" on the illustrated rolls means that as said word reaches the tracker ducts, the leader is to give a special signal to the singers to begin singing.

Obviously, my improved music-roll can also be used to teach the rudiments of orchestral leading or conducting, etc.

These and other modifications can be made which will nevertheless still be within the scope and spirit of my invention.

What I claim is:

1. In combination with a music-roll for an automatic musical instrument, a baton-movement indicating diagram appropriate to the tempo of the composition; and insignia on the roll indicating the beats of the measures relatively to the music perforations, said diagram comprising insignia similar to the foregoing applied to the respective baton movements in said diagram to correlate them with the respective measure beats to which they belong.

2. In combination with a music-roll for an automatic musical instrument, means on the roll indicating the beats of the measures relatively to the music perforations; and means on said roll correlated with said beat indicating means and indicating how to manipulate a baton in accordance with said beats.

In testimony whereof, I have signed my name to this specification, this 17th day of December 1923.

FRANKLIN G. DUNHAM.